No. 650,260. Patented May 22, 1900.
C. F. C. MEHLIG.
DENTAL TRIMMER.
(Application filed Dec. 14, 1899.)
(No Model.)
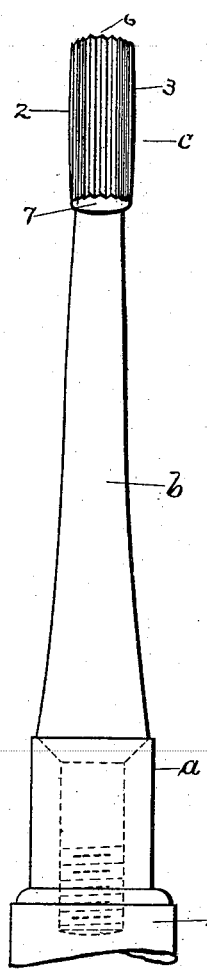
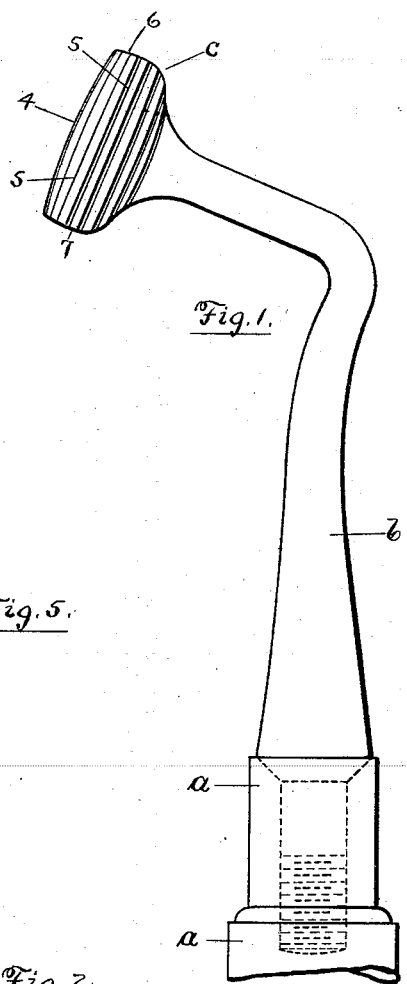
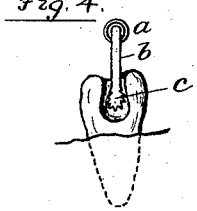
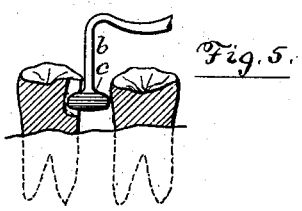
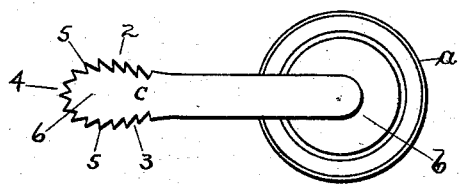
Witnesses
Inventor
Chas. F. C. Mehlig.
per L. W. Serrell & Son
Attys.

UNITED STATES PATENT OFFICE.

CHARLES F. C. MEHLIG, OF NEW YORK, N. Y.

DENTAL TRIMMER.

SPECIFICATION forming part of Letters Patent No. 650,260, dated May 22, 1900.

Application filed December 14, 1899. Serial No. 740,262. (No model.)

*To all whom it may concern:*

Be it known that I, CHARLES F. C. MEHLIG, a citizen of the United States, residing at New York city, in the county and State of New York, have invented an Improvement in Dental Trimmers, of which the following is a specification.

In dental operations, especially the filling of teeth, it is desirable to form a strong marginal wall around all surface cavities, and this is especially the case with the cervical walls of approximal cavities, (those in the adjacent meeting faces of the teeth,) which cavities are difficult to reach, and the proper shaping of which therefore taxes the skill of the dentist; and the object of my invention is to overcome this difficulty.

My invention relates to a special dental instrument or trimmer as a new article of manufacture. This instrument is provided with a head having approximately-parallel cutting edges or extending upon two opposite surfaces and also upon a rounded edge connecting the said surfaces. The head is elongated in the direction of the cutting edges, and the respective ends are smooth and slightly rounded. By an instrument thus formed the dentist can cut away, trim, and shape the edges or walls of cavities at the surfaces of the teeth, and especially shape approximal cavities in the most thorough and workmanlike manner, and the smooth ends which come in contact with the surfaces of the adjacent teeth do not injure the enamel-surface thereof, but are guided by said surface, as well as by the surface of the tooth being operated upon. Consequently the edge of the wall only is cut and shaped by the instrument.

In the drawings, Figure 1 is an elevation of the dental trimmer forming the subject of my invention. Fig. 2 is a plan and Fig. 3 an edge view. These figures are of greatly-exaggerated size. Fig. 4 is an elevation of a tooth with an approximal cavity, showing the dental trimmer in position for cutting the margin of said cavity; and Fig. 5 is a section showing two teeth and the relative position of the dental trimmer to the tooth and the approximal cavity. Figs. 4 and 5 are of large size for clearness.

The handle $a$ may be of any desired shape, and the shank or neck $b$ of the tool may be of any desired curve or configuration, according to whether the instrument is to be used upon the teeth of the lower jaw or upon the teeth of the upper jaw.

The head $c$ is elongated and provided with two opposite surfaces 2 3 and with a rounded edge 4, connecting the said surfaces, and the elongation of the head is in the direction of the cutting edges 5, which extend upon the two opposite surfaces and also upon the rounded edge, and the respective ends 6 7 of the head are slightly rounded and smooth. The two opposite surfaces 2 3 are preferably slightly convex, and the rounded edge 4, lengthwise of the teeth, is also preferably slightly convex. It is immaterial if the cutting edges 5 are cut in the direction shown or in the opposite direction, as I prefer to make dental trimmers some with the cutting edges cut one way and others with the cutting edges cut the other way. Then the instruments can be used interchangeably, and the teeth will be cut either on the down or the up stroke.

Figs. 4 and 5 show the application of the instrument and also show that the rounded ends may come in contact with the surface of the adjacent teeth without injuring the same, and these figures show, further, that the head of the instrument is of ample length to insure the cutting and trimming of the marginal wall of the cavity and to further insure the instrument remaining in place and not slipping out or against the gums. This marginal wall may be trimmed, as shown particularly in Fig. 4, so that an even continuous margin without irregularities, but smooth and true, may be formed by the skilful operation of this instrument.

In dental operations it is quite essential to properly prepare this marginal wall, because usually this wall has a ragged and very thin edge which it is necessary to remove before a proper and strong edge is presented that will be practically unyielding when a filling is put in place to preserve the tooth.

While these instruments are especially adapted for trimming the marginal edges of approximal cavities in molar and bicuspid teeth, they may also be employed to equal advantage in trimming the marginal edges of other cavities.

I claim as my invention—

1. A dental instrument or trimmer as a new article of manufacture, comprising a shank and a head having two opposite surfaces and a rounded edge connecting the same, formed with cutting edges extending lengthwise of the greatest elongation of the head, substantially as set forth.

2. A dental instrument or trimmer as a new article of manufacture, comprising a shank and a head having two opposite surfaces and a rounded edge connecting the same formed with cutting edges extending lengthwise of the greatest elongation of the head, and ends to the said head that are smooth and slightly rounded, substantially as set forth.

3. A dental instrument or trimmer as a new article of manufacture, comprising a shank and an elongated head having two opposite slightly-convex surfaces and a rounded edge connecting the said surfaces with cutting edges in parallel lines upon the said surfaces and each running lengthwise of the head, substantially as set forth.

4. A dental instrument or trimmer as a new article of manufacture, comprising a shank and an elongated head having two opposite slightly-convex surfaces and a rounded edge connecting the said surfaces with cutting edges in parallel lines upon the said surfaces and each running lengthwise of the head, the said rounded edge being also slightly convex and the said head being provided with opposite ends that are smooth and slightly rounded, substantially as set forth.

Signed by me this 8th day of December, 1899.

C. F. C. MEHLIG.

Witnesses:
GEO. T. PINCKNEY,
E. E. POHLÉ.